(12) United States Patent  
Buchanan

(10) Patent No.: US 6,364,324 B1
(45) Date of Patent: Apr. 2, 2002

(54) SNOWMOBILE SLED

(76) Inventor: King L. Buchanan, 7100 Old Seward Hwy A, Anchorage, AK (US) 99518-2200

( * ) Notice: Subject to any disclaimer, the term of this patent is extended or adjusted under 35 U.S.C. 154(b) by 0 days.

(21) Appl. No.: 09/652,670

(22) Filed: Aug. 31, 2000

(51) Int. Cl.$^7$ .............................................. B62B 13/02
(52) U.S. Cl. ....................... 280/15; 280/11.18; 280/18
(58) Field of Search ............................. 280/15, 16, 17, 280/18, 19, 19.1, 24, 28.15, 28.16, 11.18, 609; 296/19, 20

(56) References Cited

U.S. PATENT DOCUMENTS

| 3,319,972 | A | * | 5/1967 | Gallaher | 280/18 |
| 3,372,944 | A | * | 3/1968 | Lauritzen | 280/17 |
| 3,432,182 | A | * | 3/1969 | Solipasso | 280/18 |
| 3,453,000 | A | * | 7/1969 | Asher | 280/18 |
| 3,565,452 | A | * | 2/1971 | Trumley et al. | 280/15 |
| 3,746,357 | A | | 7/1973 | Haskins | 280/15 |
| 3,921,239 | A | * | 11/1975 | Sovia et al. | 280/18 |
| 3,924,871 | A | * | 12/1975 | Mesenbring | 280/19 |
| 3,937,482 | A | | 2/1976 | Johnson | 280/18 |
| 4,046,393 | A | | 9/1977 | Vadnais | 280/19 |
| 4,083,577 | A | * | 4/1978 | Ford | 280/609 |
| 4,239,247 | A | * | 12/1980 | Hinz | 280/24 |
| 4,304,418 | A | * | 12/1981 | Foster | 280/19 |
| 4,389,066 | A | | 6/1983 | Weir et al. | 296/19 |
| 4,524,984 | A | * | 6/1985 | Axelson | 280/18 |
| 5,242,176 | A | * | 9/1993 | Hendrickson | |
| 5,263,745 | A | * | 11/1993 | Storey | 280/15 |
| 5,868,405 | A | * | 2/1999 | Lavecchia | 280/18 |
| 6,017,043 | A | * | 1/2000 | Bennett et al. | 280/18 |
| D433,474 | S | * | 11/2000 | Puyo | |

OTHER PUBLICATIONS

Updated Publication, Hitch & Haul, Boggans by Equinox Industries, 12 pages.

* cited by examiner

*Primary Examiner*—Eric Culbreth
*Assistant Examiner*—Christopher Bottorff
(74) *Attorney, Agent, or Firm*—Patent & Trademark Services; Thomas Zack; Joesph H. McGlynn

(57) ABSTRACT

A tow sled designed for use with a self powered snowmobile. A draw bar and hitch devices are provided to join the sled to the snowmobile. The tow sled has two lower and spaced outside runners that extend along its length with each runner having a lower ground engaging surface and an upright surface oriented at approximately ninety degrees. Mounted to outside of the outside runners near the rear end of the sled are two side hard metal plates. Each of the plates have a lower ground engaging surface that extends below the ground engaging surface of the outside runner on which it is mounted. The lower plate surfaces are used to engage hard ice with the outside runners contacting the ice to provide for steady and straight tracking of the sled. To secure cargo with cross sled tie down cords like bungee cords or the like, fourteen tie down members made with brackets and a joining rope are spaced along the length of the sled and are mounted to the sled. A protective snowshield is mounted on the front end of the tow sled.

6 Claims, 5 Drawing Sheets

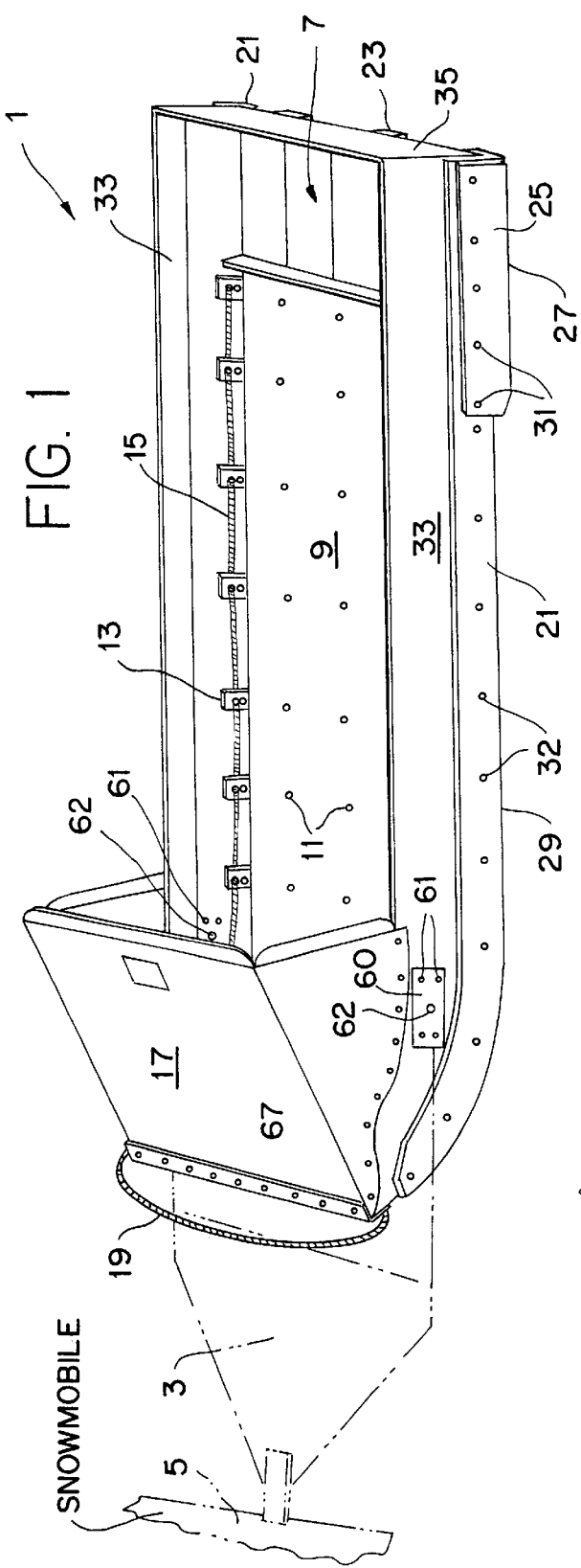
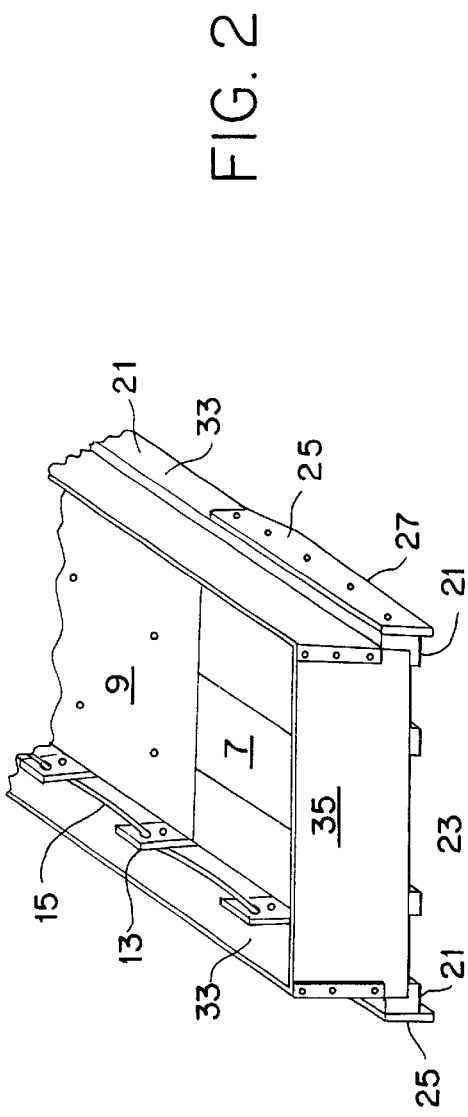
FIG. 1
FIG. 2

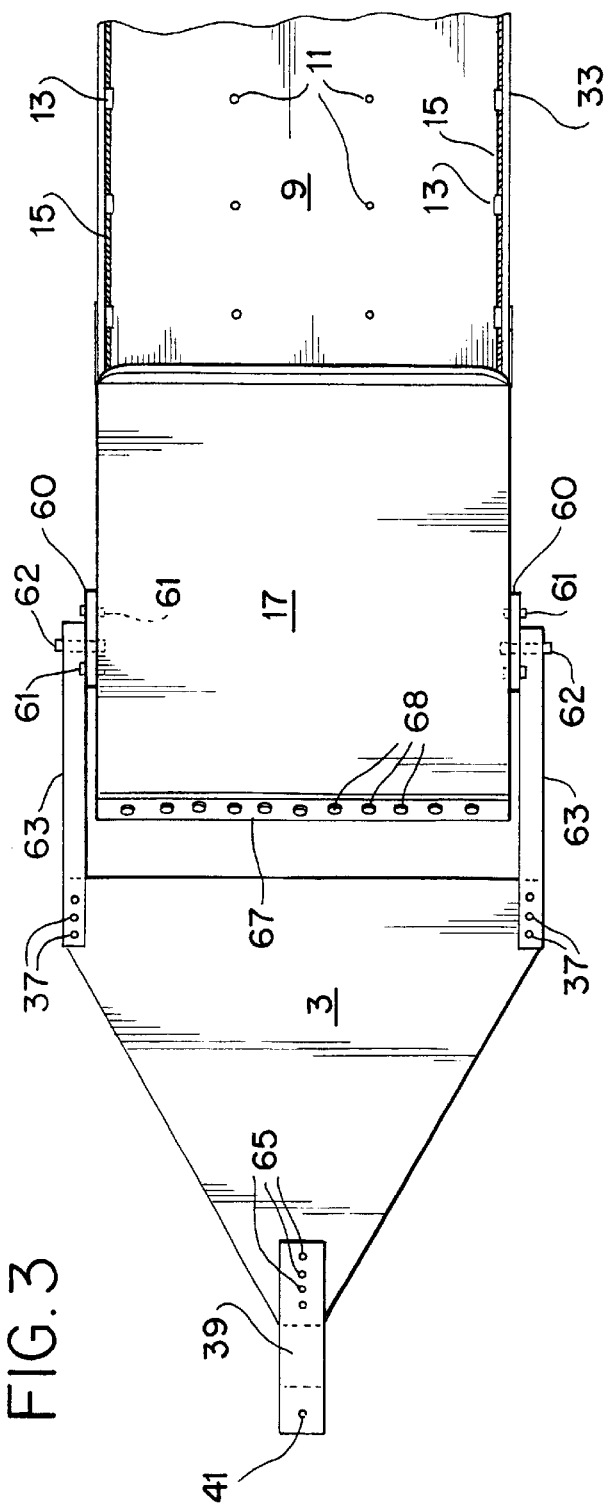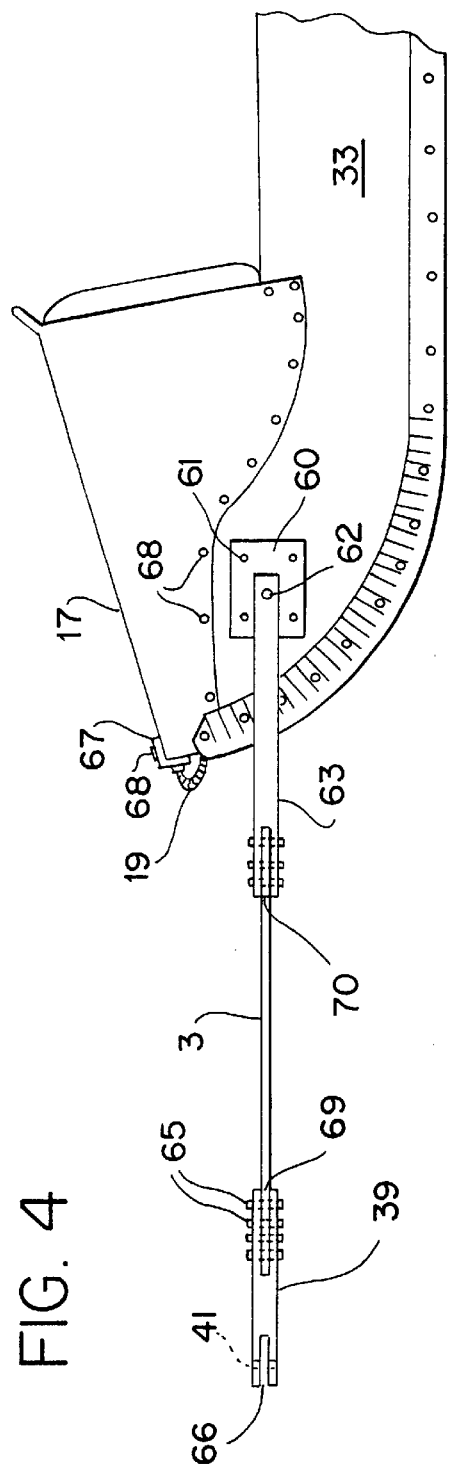

FIG. 18
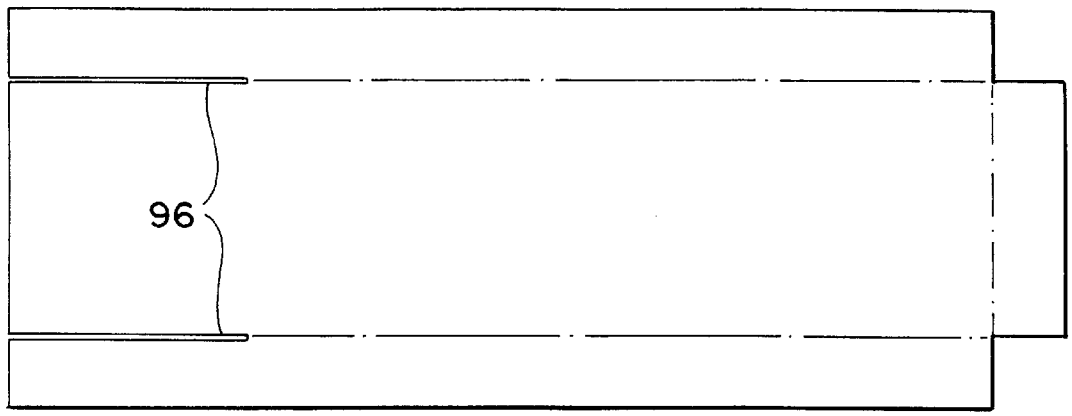
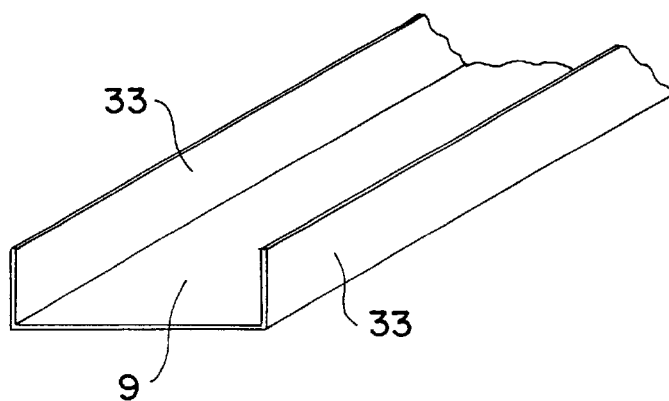
FIG. 19
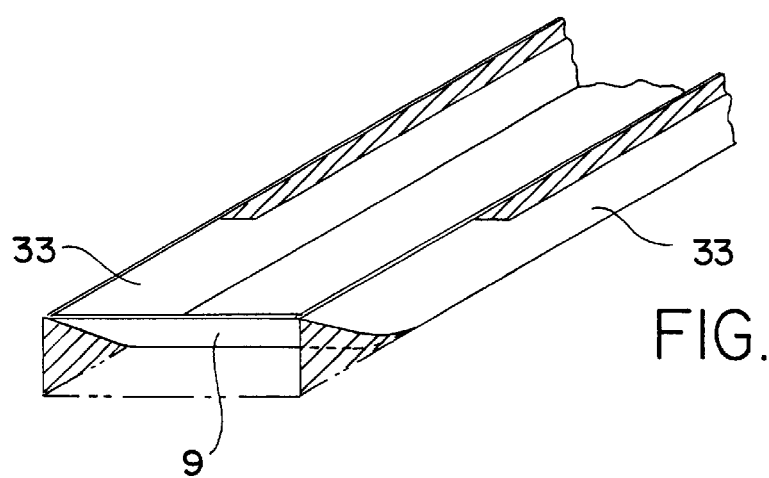
FIG. 20

SNOWMOBILE SLED

BACKGROUND OF THE INVENTION

This invention relates to a sled that is adapted to be pulled by a snowmobile.

Sleds with different types of construction have been towed by snowmobiles. Some such sleds have been specifically designed for a given purpose, like an ambulance sled while other sleds may be used to haul passengers, goods, or any combination of these persons and objects. For example, one prior art sled used for an ambulance has a tow bar attached to the front steerable ski of the sled. Another sled is self up righting and has a tow rope attached below the sled's center of gravity.

One prior art sled is constructed of heavy gauge low density polyethylene material having a molecular memory. Still another sled has both a wind screen and a removable cover. Various sled configurations with tow rigid bars, articulated hitches, tow ropes and other characteristics are also known and described in a publication.

DESCRIPTION OF THE PRIOR ART

Sleds that are designed to be towed by a snowmobile are known. For example, in the U.S. Pat. No. 3,746,357 to Haskins there is disclosed a sled used for an ambulance which has a tow bar attached to the front steerable ski of the sled.

U.S. Pat. No. 3,937,482 to Johnson discloses a sled that is self up righting and has a tow rope attached below the sled's center of gravity.

U.S. Pat. No. 4,046,393 to Vadnais discloses a sled constructed of heavy gauge low density polyethylene material having a molecular memory.

U.S. Pat. No. 4,389,066 to Weir et al. discloses a sled with both a wind screen and a removable cover.

The publication entitled "Hitch & Haul" by Boggans discloses sled configurations with tow rigid bars, articulated hitches, tow ropes and other characteristics.

In the present invention a snowmobile's tow sled has outside runners that are used to hold the tracking straight, plates attached to the outside runners and down straps for securing items to the sled all as will be detailed in the specification that follows hereafter.

SUMMARY OF THE INVENTION

This invention relates to a tow sled used with a snowmobile that has specially constructed outside runners and related side plates.

It is the primary object of the present invention to provide for the improved construction of a tow sled used with a snowmobile.

Another object is to provide for such a tow sled in which there are, outside runners with steel ice engaging side plates on the back of the outside runners.

Still another object is an improved drawbar and hitch.

These and other objects and advantages of the present invention will become apparent to readers from a consideration of the ensuing description and the accompanying drawings.

BRIEF DESCRIPTION OF THE DRAWINGS

FIG. 1 is a perspective view of the tow sled of the present invention as viewed from one side.

FIG. 2 is a perspective view of the back of the invention shown in FIG. 1.

FIG. 3 is a top view of the snowshield and the front draw bar.

FIG. 4 is a side view showing the snowshield and the draw bar shown in FIG. 3.

FIG. 18 is a top view of the sled main support surface with two slits forward and two cut outs in back.

FIG. 19 is a perspective view of the sled main support surface after the two sides have been bent into position.

FIG. 20 is a perspective view of the completed sled main front support surface after the two sides have been bent into position

DESCRIPTION OF THE PREFERRED EMBODIMENT

Figure 5:
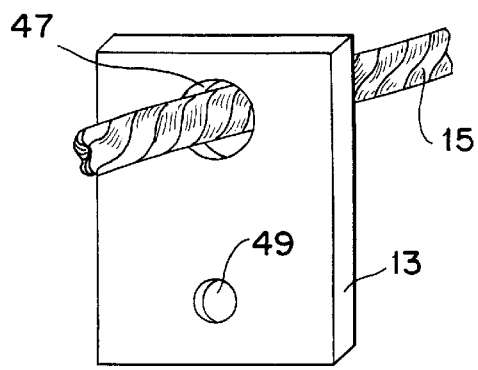
FIG. 5 is a detailed perspective view of one of the tie down brackets and rope.

FIG. 1 is a perspective view of the main tow sled body 1 of the present invention as viewed from the side. In this view the draw bar 3 (see FIGS. 3, 4 and 11–17) as attached to a snowmobile 5 whose end is partially shown in dotted line format. The self power driven snowmobile, usually a gasoline powered engine, pulls the trailing attached sled 1 and its contents along the ground. In this embodiment the sled 1 is specifically designed to carry cargo and has one back portion 7 sized and shaped to hold cans for gasoline that is used to power the snowmobile. Along the two opposite sides of the planar bottom surface 9 are the two sides 33. In constructing the sides 33 they are bent upwardly at approximately 90 degrees from the upper surface 9. Fastened by screws to sides 33 and the outside runners 21 are spaced aligned tie down brackets 13 (see FIG. 5). Each individual bracket 13 has two holes with a rope 15 joining each of the aligned brackets on the inside of the sides 33. Only one of the two side nylon rope 15 segments and its associated supporting brackets 13 is visible in this view.

A protective three sided front snowshield or housing 17 is shaped to reduce air drag and to partially shield contents and is attached to the front end of the tow sled body 1 by fasteners likes screws, bolts, etc. To manually move the sled short distances, a tow rope 19 is attached at its two ends to the opposite sides of the snowshield 17. The sled's bottom surface which contacts the snow or ice covered ground has two opposite side outside runners 21, two spaced inside runners 23, and two very strong rear steel plates 25 located outside of the outside runners 21. The two spaced inside runners 23 extend in the same direction along the sled's bottom lengthwise as the outside runners 21 and have a flat ground engaging lower surface with the same width as the outside runner's ground engaging lower surface. Only one of the near side plate 25 is visible in this view it being understood that the other plate 25 is located on the outside of the opposite side outside runner 21 in the same rear sled position. It is important to note that the lower ground engaging edges 27 of the two steel plates 25 extend further down edges than the lower edges 29 of the outside runners 21. The plates 25 are bolted by bolts 31 to the runners 21 and the sides 33. Like screws 32 are used to mount each of the two outside runners to the undercarriages and sides 33 of the sled 1.

FIG. 2 is a perspective view of the back of the invention shown in FIG. 1. In this view the opposite side brackets 13 and rope 15 are shown along with the right hand side outside runner 21 and its rear plate 25. The sled's elevated opposite wall sides 33 are higher than the surfaces 7 and 9 and extend lengthwise in the same direction as the runners 21. These sides 33 provide protective walls to prevent articles within their confines from falling off the sled as it is towed by the snowmobile. By tying bungee type cords or other cords cross wise (not shown) to the two parallel opposite side ropes 15 cargo on the generally flattened surfaces 7 or 9 can be overlapped and further restrained from moving as the sled is towed. At opposite sides of the sled's back panel 35 the two identical ends of the lower trailing edges of the two outside runners 21 are just visible. Each outside runner 21 has a vertical side and a lower right angled side that faces inwardly toward the same lower side of the other outside runner as more clearly illustrated in FIG. 6.

FIG. 3 is a top view of the front drawbar 3 used to attach the sled 1 to a snowmobile and the snowshield 17. The drawbar 3 is generally triangular in shape and made of ½ inch or thicker ultra high molecular weight polyethylene (UHMW) material sometimes also abbreviated as UHMW-PE. The drawbar is attached to the sled 1 above the outside runner 21 and below the snowshield 17 at a reinforcing plate 60 (see FIG. 1) by means of of the two side drawbar arms 63 and their attachment pivot bolts 62. Each of the arms 63 have slots to receive the side ends of the drawbar 3 which is secured in to each arm by three bolts 37. The two reinforcing plates 60 are visible on both sides of the sled between the arms 63 and each is screwed to the sled body by four bolts 61. The attachment bolts 62 hold the arms 63 to the sled body and allow for up and down pivotally motion of the sled when the sled is attached to the snowmobile 5. The front cap 67 is a strip of UHMW material used to secure the snowshield 17 to the sled with spaced rivets 68. Space is provided between the strip 67, the sled body 1 and the snowshield 17 for the tow rope 19 (not shown in FIG. 3). The third front side of drawbar 3 is attached to the UHMW material hitch 39 that directly engages a mating hitch (not shown) fitting mounted on the rear of the snowmobile. Stainless steel bolts 65 may be used to secure the hitch 39 to the drawbar 3. Bolts 37 are used to secure the side drawbar arms to the drawbar. Details of the undercarriage of the sled body 1 have been omitted from this view.

FIG. 4 is a side view of the drawbar 3 shown in FIG. 3 and the snowshield 17. The front slot 66 in the front end of the hitch 39 is used to receive a hinged metal tab with a hole so that a pin may drop through the vertically disposed hole 41 and secure the main sled body 1 to the leading snowmobile 5. This arrangement of parts allows for the side wise rotation of the hitch 39 and up and down motion at the hinged metal-tab as the snowmobile pulls the sled. The end of the hitch 39 may be custom fitted to a particular sled. The rear hitch slot 69 receives the front end of the drawbar 3 and is secured to it by four aligned bolts 65 with washers and nuts. The slots 70 in each of the drawbar side arms 63 receives the back side of the drawbar 3 and secures the drawbar with three bolts 37 and related washers and nuts.

The reinforcing UHMW plates 60 are attached to opposite sled sides using four bolts 61 on side with engaging washers and nuts. The bolts 62 and their associated washers and nuts are received by the plates 60 and are used to attach and secure the drawbar 3 to the sled body 1. Spaced stainless steel rivets 68 secure the snowshield 17 to the sled on both sides and to the front cap 67 holding rope 19.

FIG. 5 is a detailed perspective view of one of the side tie down brackets 13 and its associated rope 15. The UHMW bracket 13 has a ⅜ inch hole 49 in the bottom to receive a screw 64 (not shown) that holds together inside out the bracket 13, the sled 1 and the outside runner 21. The upper ⅜ inch hole 47 receives the tie down rope 15. Rope 15 extends between the spaced adjacent brackets on a side and droops in an untensioned manner. The two opposite ends of rope 15 are fastened to the two most rear side-brackets 13 to keep the rope in place in the supporting brackets.

Figure 6:
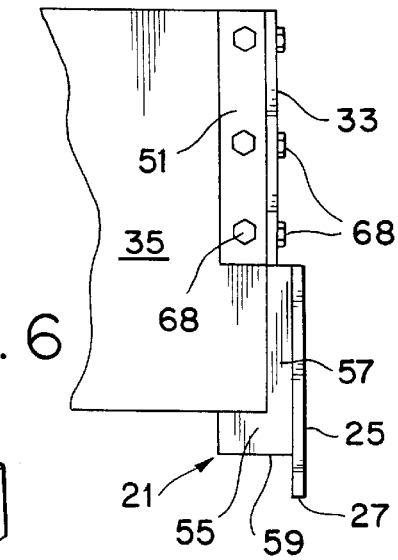
FIG. 6 is a detailed view from the back of the sled showing one side where the metal plate is joined to the outside runner.

FIG. 6 is a detailed view from the back of the sled 1 showing one side where one of the two metal plates 25 is joined to the outside runner 21. In this view an outside reinforcing corner bracket 51, not previously shown, has been added. Corner bracket 51 is mounted to the back surface 35 and the adjacent surface of side surface 33 by rivets 68 engage both surfaces. The outside runner 21 (see also FIGS. 7–10) is cut from one strip of UHMW material into an "L" shape to provide (1) both a strong one-piece outside runner 55 that is also a side strengthener 57 for the bend of the sled and the side, and (2) sharp edges that cut into the snow and with the same sharp edges of the inside runners and the length of the four runners gives great directional control to the entire sled. The horizontally disposed leg 55 section has a lower edge surface 59 which normally engages the ground. Surface 59 extends 0.25 inches up from the outside plate's lower surface 27. In this way, should the ground be ice covered and hard only the nearby lower ground engaging surface 27 of plate 25 would touch the ice at the rear of the sled along the lower edge of plate 25. The two opposite side plates 25 would act to help steady the sled and track straight. At the same time if the ground is snow covered and softer than ice, both lower side surfaces 27 and 59 will engage the snow with little added increase in frictional contact. In one embodiment the outside runner leg 55 had a ground engaging width of 1.5 inches while the very hard metal plate 25 had a width on surface 27 that was considerably less(i.e., ¼ inch).

Figure 7:
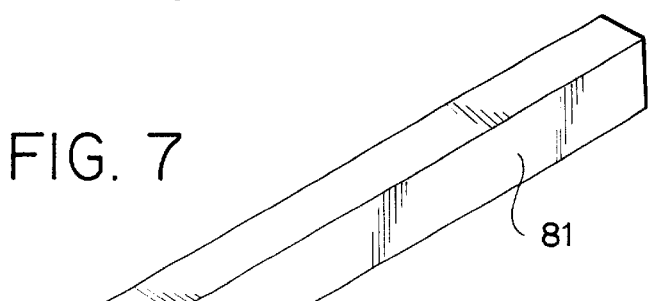
FIG. 7 is a perspective view of the raw bar material used to make the outside runner.

FIG. 7 is a perspective view of the straight bar raw material used to make runner 21. The runners are cut out of a piece of raw bar material 81 made from Ultra High Molecular Weight Polyethylene plastic material.

Figure 8:
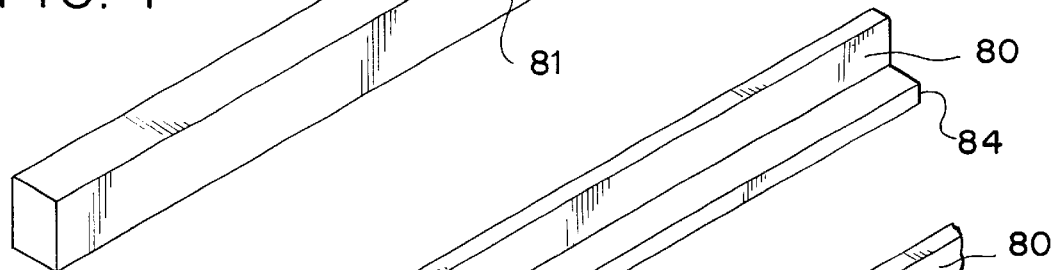
FIG. 8 is a perspective view of the FIG. 7 bar material after initial processing for one of the outside runners.

FIG. 8 is a perspective view of a further processed bar material 81 shown in FIG. 7 used to make one of the two outside runners 21. At this stage, the straight runner is elongated and has a cut out along its side that forms two inside legs that meet at approximately right angles. In one embodiment the total runner length was 96 inches and the leg 80 was 2 inches and the leg 82 1.5 inches, with a height 84 of 0.75 inches.

Figure 9:
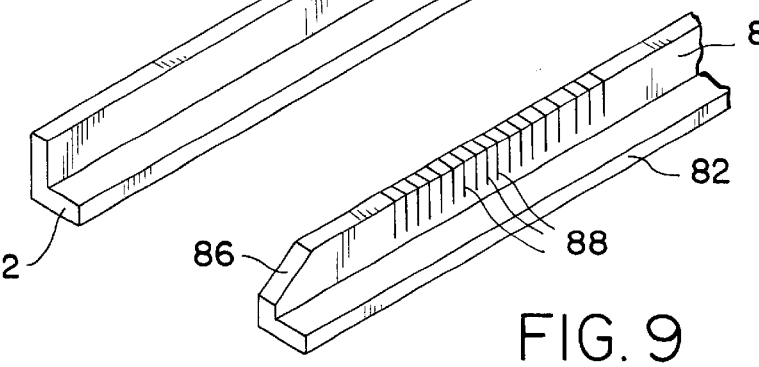
FIG. 9 is a perspective view of the further processed runner of FIG.

FIG. 9 is a perspective view of the still further processed outside runner shown in FIG. 8. In this view the front end has been beveled at corner 86 and a series of spaced indentation 88 have been made in the surface of leg 80. These indentations are at 0.5 inches apart and enable the straight partially processed runner bar of FIG. 8 to be bent upwardly. The indentations extend downwardly into the leg 80 but not into the lower supporting leg 82. The bend is used to fit the shape of the sled front bottom and to provide the necessary area to screw each fifth wide tab to the sled side and bottom.

Figure 10:
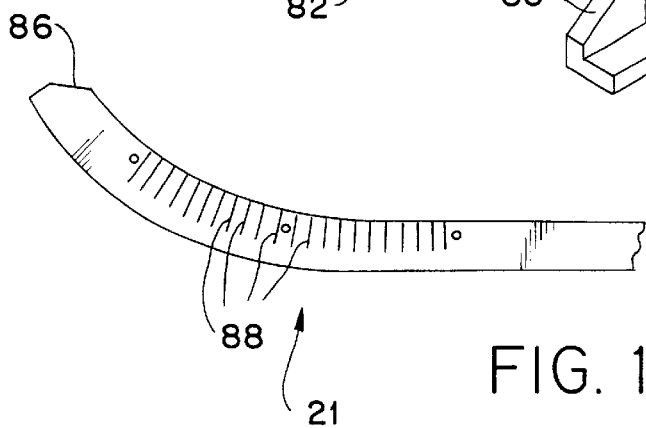
FIG. 10 is a side view of the completely processed outside runner.

FIG. 10 is a side view of one of the completely processed outside runners illustrating its finally formed upwardly bent forward end. In this view the two legs are inside and therefore not visible.

Figure 11:
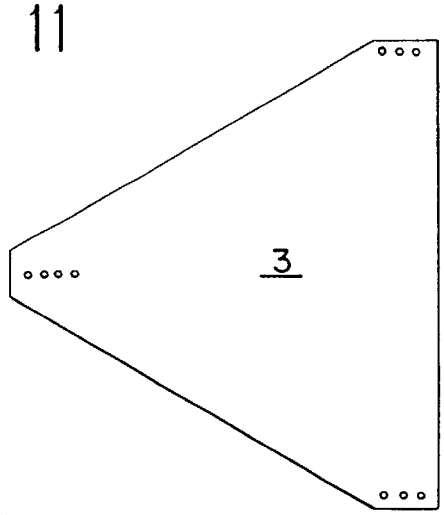
FIG. 11 is a top view of the front drawbar.

FIG. 11 is a top view of the front drawbar 3 by itself. Appropriate holes for the previously mentioned fasteners extend through the front end of the drawbar and the two opposite sides.

Figure 12:
FIG. 12 is a side view of the front drawbar.

FIG. 12 is a side view of the front drawbar 3 shown in FIG. 11. The drawbar is relatively thin when compared to its overall length. In one embodiment the drawbar has a thickness of 0.5 inches with an overall length of 30 inches and a maximum back width of 29.25 inches with a front width of 2 inches.

Figure 13:
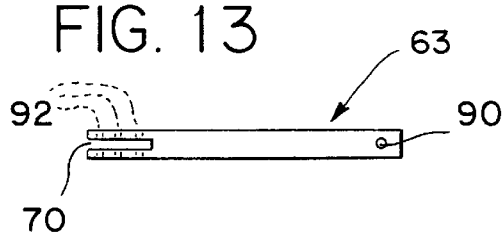
FIG. 13 is a side view of one of the drawbar side arms.

FIG. 13 is a side view of one of the side drawbar arms 63. A single hole 90 extends directly through the drawbar arm's side surface through the bar while three parallel holes 92 extend down through the top of the drawbar.

Figure 14:
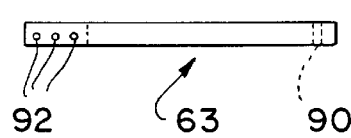
FIG. 14 is a top view of one of the drawbar side arms.

FIG. 14 is a top view of one of the drawbar side arms shown FIG. 13. In this figure the three top holes 92 are visible with the sidewardly extending hole 90 being shown in dotted line format.

Figure 15:
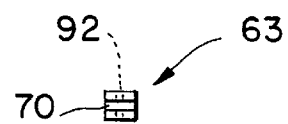
FIG. 15 is a front end view of one of the drawbar side arms.

FIG. 15 is a front end view of one of the drawbar side arms shown in FIGS. 13 and 14. In this view the side arm slot 70 used to receive the back side of the drawbar 3 and secured to the drawbar with by the three bolts 37 and related washers and nuts is shown.

Figure 16:
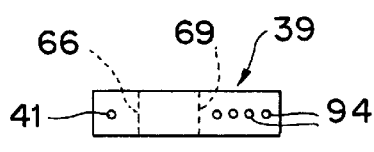
FIG. 16 is a top view of the front end of the hitch.

FIG. 16 is a top view of the hitch 39. Both the slot 66 in the front end of the hitch 39 and the rear slot 69 are shown in dotted line format. The latter slot is intersected by four through holes 94 which holes receive the previously mentioned four aligned bolts 65 with washers and nuts.

Figure 17:
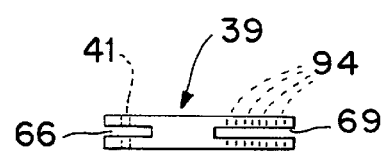
FIG. 17 is a side view of the front end of the hitch.

FIG. 17 is a side view of the front end of the same hitch 39. In this view the two slots 66 and 69 are clearly visible and are shown extending into the body of the hitch with the intersecting holes indicated.

FIG. 18 is a top view of the sled's main support surface 9 before it is processed with sides. Two slits 96 extend through the material of the rectangular shaped surface and assist in forming the depending sides 33. Two square pieces are cut out to form the back ends that is bent up to meet the back side of 33.

FIG. 19 is a perspective view of the sled main support surface after the two depending sides 33 have been bent into position with the surface 9 between them.

FIG. 20 is a perspective view after the completed sled main support surface has been uplifted and after the two sides 33 have been bent into position.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A tow sled for use with a snowmobile comprising:

the tow sled having a length and two opposite sides, two outside runners, one of said outside runners being attached to each of the opposite sides of the tow sled and extending substantially the entire length of the tow sled, each of said two outside runners have a lower ground engaging surface and an upright surface, said upright surface being approximately ninety degrees from the ground engaging surface, two side plates, one of side side plates being mounted on and outside of each of said outside runners, said plates each having a lower ground engaging surface that extends below the ground engaging surface of the outside runner on which mounted;

two inside runners mounted to the bottom of the tow sled and spaced from the outside runners, said two inside runners being between the outside runners and extending in the same direction as the outside runners, and tie down members extending along the length of said sled and mounted to the tow sled.

2. The tow sled as claimed in claim 1, wherein said the down members include spaced brackets with a rope extending between the brackets.

3. The tow sled as claimed in claim 1, wherein said tow sled has a front end with a draw bar support for attaching the tow sled to a snowmobile.

4. The combination of a self powered snowmobile and a tow sled for use with the snowmobile comprising:

a self powered snowmobile having a rear end that is attachable to a tow sled;

a tow sled attachable to said snowmobile, said tow sled having a length and two opposite sides, two outside runners, one of said outside runners being attached to each of the opposite sides of the tow sled and extending substantially the entire length of the tow sled, each of said two outside runners have a lower ground engaging surface and an upright surface, said upright surface being approximately ninety degrees from the ground engaging surface;

two side plates, one of side side plates being mounted on and outside of each of said outside runners, said plates each having a lower ground engaging surface that extends below the ground engaging surface of the outside runner on which mounted; two inside runners mounted to the bottom of the tow sled and spaced from the outside runners, said two inside runners being between the outside runners and extending in the same direction as the outside runners, and tie down members extending along the length of said sled and mounted to the tow sled.

5. The combination as claimed in claim 4 including a drawbar to attach said tow sled to the snowmobile.

6. The combination as claimed in claim 4 wherein said tow sled has a front end with a protective snowshield attached to said front end of the tow sled.

* * * * *